US009825695B2

(12) United States Patent
Lin et al.

(10) Patent No.: US 9,825,695 B2
(45) Date of Patent: Nov. 21, 2017

(54) METHOD OF MULTIUSER SUPERPOSITION TRANSMISSION AND TRANSMITTER USING THE SAME

(71) Applicant: Industrial Technology Research Institute, Hsinchu (TW)

(72) Inventors: Chia-Hung Lin, Tainan (TW); Shin-Lin Shieh, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/281,073

(22) Filed: Sep. 30, 2016

(65) Prior Publication Data

US 2017/0099098 A1    Apr. 6, 2017

Related U.S. Application Data

(60) Provisional application No. 62/236,149, filed on Oct. 2, 2015.

(51) Int. Cl.
   *H04B 7/04*    (2017.01)
   *H04B 7/26*    (2006.01)
   (Continued)

(52) U.S. Cl.
   CPC ............. *H04B 7/26* (2013.01); *H04B 7/0639* (2013.01); *H04B 15/00* (2013.01); *H04W 72/042* (2013.01); *H04W 76/046* (2013.01)

(58) Field of Classification Search
   CPC ........ H04B 15/00; H04B 7/26; H04B 7/0639; H04W 72/042; H04W 76/046
   See application file for complete search history.

(56) References Cited

U.S. PATENT DOCUMENTS 8,953,517 B2 *   2/2015   Soong ................. H04W 72/042
                                                       370/208
2005/0213682 A1 *  9/2005   Han .................... H04B 7/0408
                                                       375/267
(Continued)

FOREIGN PATENT DOCUMENTS

| CN | 104205717 | 12/2014 |
| TW | 201108627 | 3/2011 |
| TW | 201615043 | 4/2016 |

OTHER PUBLICATIONS

Benjebbour et al., "Concept and practical considerations of nonorthogonal multiple access (NOMA) for future radio access," Intelligent Signal Processing and Communications Systems (ISPACS), Nov. 2013, pp. 770-774.

(Continued)

*Primary Examiner* — Dac Ha
(74) *Attorney, Agent, or Firm* — JCIPRNET

(57) ABSTRACT

The disclosure is directed to a method of multiuser superposition transmission (MUST) method and a transmitter using the same method. In one of the exemplary embodiments, the disclosure is directed to a method of multiuser superposition transmission (MUST) method used by a base station. The method would include not limited to: determining a first bit stream to be transmitted; encoding the first bit stream to generate an encoded first bit stream which has a plurality of binary levels per symbol; determining a first encoding rate for each of the binary levels of the encoded first bit stream, wherein at least two of the levels of the encoded first bit stream have a different code rate; and attaching a first plurality of redundancy bits based on the first encoding rate.

18 Claims, 13 Drawing Sheets

(51) Int. Cl.
*H04B 7/06* (2006.01)
*H04B 15/00* (2006.01)
*H04W 72/04* (2009.01)
*H04W 76/04* (2009.01)

(56) References Cited

U.S. PATENT DOCUMENTS

| | | |
|---|---|---|
| 2007/0177569 A1 | 8/2007 | Lundby |
| 2009/0235142 A1 | 9/2009 | Galbraith et al. |
| 2010/0023830 A1* | 1/2010 | Wengerter ............ H04L 1/0025 714/748 |
| 2010/0323709 A1 | 12/2010 | Nam et al. |
| 2011/0286544 A1* | 11/2011 | Avudainayagam ... H04L 1/0009 375/295 |
| 2016/0191174 A1 | 6/2016 | Hwang et al. |
| 2016/0191225 A1 | 6/2016 | Hwang et al. |
| 2017/0064735 A1* | 3/2017 | Sumasu ................ H04L 5/0053 |

OTHER PUBLICATIONS

Saito et al., "System-Level Performance Evaluation of Downlink Non-orthogonal Multiple Access (NOMA)," 2013 IEEE 24th International Symposium on Personal, Indoor and Mobile Radio Communications: Fundamentals and PHY Track, Sep. 2013, pp. 611-615.

Perotti et al., "Non-Orthogonal Multiple Access for Degraded Broadcast Channels: RA-CEMA," 2015 IEEE Wireless Communications and Networking Conference (WCNC 2015), Oct. 2014, pp. 735-740.

Huawei, "Candidate schemes for superposition transmission," R1-152493, 3GPP RNA1 #81 contribution, May 25-29, 2015, pp. 1-11.

NTT DOCOMO, "Candidate non-orthogonal multiplexing access scheme," R1-153333, 3GPP RNA1 #81 contribution, May 2015, pp. 1-7.

Wachsmann et al., "Multilevel Codes: Theoretical Concepts and Practical Design Rules," IEEE Transactions on Information Theory, Jul. 1999, pp. 1361-1391.

3GPP, "3rd Generation Partnership Project; Technical Specification Group Radio Access Network; Study on Downlink Multiuser Superposition Transmission (MUST) for LTE (Release 13)," 3GPP TR 36.859, Dec. 2015, pp. 1-48.

"Office Action of Taiwan Counterpart Application", dated Jun. 6, 2017, p. 1-p. 5, in which the listed references were cited.

* cited by examiner

METHOD OF MULTIUSER SUPERPOSITION TRANSMISSION AND TRANSMITTER USING THE SAME

CROSS-REFERENCE TO RELATED APPLICATION

This application claims the priority benefits of U.S. provisional application Ser. No. 62/236,149, filed on Oct. 2, 2015. The entirety of the above-mentioned patent application is hereby incorporated by reference herein and made a part of this specification.

TECHNICAL FIELD

The disclosure is directed to a method of multiuser superposition transmission (MUST) method and a transmitter using the same method.

BACKGROUND

There are at least two conventional multiuser superposition transmission schedules. One is Non-Orthogonal Multiple Access (NOMA), and another is Rate-Adaptive Constellation Expansion Multiple Access (RA-CEMA/REMA).

Non-orthogonal transmission technology has been discussed extensively due to its better cell coverage and higher throughput for users located at cell edge region than the traditional orthogonal multiple access (OMA) technology. In order to improve user throughput of OMA, user equipments (UEs) of non-orthogonal transmission technology would need to enhance their receivers with interference cancellation capability in order to eliminate interferences generated by other users.

FIG. 1 illustrates a conventional NOMA transmitter. The NOMA transmitter is assumed to transmit user data of a near UE ($UE_N$ information 101) and user data of a far UE ($UE_F$ information 111). The $UE_N$ information 101 would be encoded by a Turbo Encoder 102 to generate encoded $UE_N$ information 101 ($C^N$) which would then be modulated by a Pulse Amplitude Modulator (PAM) 103. Similarly, the $UE_F$ information 111 would be encoded by a Turbo Encoder 112 to generate encoded $UE_N$ information 111 ($C^F$) which would also be modulated by a Phase Amplitude Modulator (PAM) 113. The output of the PAM modulator 103, $S_N$, would be power scaled by the square root of $P_N$ by a multiplier 104, and where the output of the PAM modulator 113, $S_F$, would be power scaled by the square root of $P_F$ by a multiplier 114, where ($P_F > P_N$), and $P_N + P_N = 1$. After the output of the power scaling would be summed by an adder 121 to generate a transmitted symbol Z, where $Z = \sqrt{P_N}S_N + \sqrt{P_F}S_F$. Notice that for the NOMA transmitter, the $UE_N$ information 101 and the $UE_F$ information 111 to be transmitted would have a different constellation diagram. For the example of FIG. 1, the $UE_N$ information 101 to be transmitted could be modulated according to 2-PAM whereas the $UE_F$ information 111 to be transmitted could be modulated according to 4-PAM. The two constellation diagrams which are originally Gray Mapping after combining will become Non-Gray Mapping. The joint constellation would increase the complexity of a wireless demodulator and decoder in the receiving end.

FIG. 2 illustrates a conventional REMA (or RA-CEMA) transmitter. For the REMA transmitter, user data of a near UE ($UE_N$ information 101) to be transmitted would be encoded by a Turbo Encoder 102 to generate encoded $UE_N$ information 101 ($C^N$), and the user data of a far UE ($UE_F$ information 111) to be transmitted would be encoded by a Turbo Encoder 112 to generate encoded $UE_N$ information 111 ($C^F$). Instead of being modulated right away, both $C^N$ and $C^F$ would be transmitted a REMA function 221. The REMA function 221 essentially takes both the both $C^N$ and $C^F$ and operates them by a transmission matrix. The transmission matrix as shown in FIG. 2 would include rows of near UE 231, rows of far UE 232, and columns of available REs 233. The $C^N$ and $C^F$ would be operated by the transmission matrix and undergo row permutation to generate an output of the REMA function (I). The output, I, could be modulated by a conventional modulator such as a PAM modulator 222 and thus would require a less complicated receiver relative to the design of FIG. 1.

FIG. 3A illustrates a MUST category 1 (NOMA) transmitter. The MUST category 1 transmitter is similar to the design of FIG. 1 as two UE information (TB1, TB2) to be transmitted are sent to encoders (302a, 302b) and subsequently modulators (303a, 303b). The modulated UE information are allocated with different powers by a power allocation block 304 and subsequently summed by an adder 305. The detail with regard to the MUST category 1 transmitter is included in 3GPP TR 36.859 which is incorporated by reference for all purposes.

FIG. 3B illustrates a MUST category 2 (NOMA with Gray mapping) transmitter. The MUST category 2 transmitter is similar to the design of FIG. 1 & FIG. 3A as two UE information (TB3, TB4) to be transmitted are sent to encoders (312a, 312b). The encoded UE information is transmitted to a joint modulation and power allocation block 313 are allocated with different powers by a power allocation block 313 and subsequently summed by an adder 314. The joint modulation and power allocation block 313 are a combination of modulators 303a 303b and power allocation block 304 but with Gray mapping. The detail with regard to the MUST category 2 transmitter is included in 3GPP TR 36.859 which is incorporated by reference for all purposes. The downlink MUST transmitter for LTE (Rel-14 WI) and its joint constellation is shown in FIG. 4.

FIG. 5 illustrates a MUST category 3 (REMA) transmitter. The MUST category 3 transmitter is similar to the design of FIG. 2 as two UE information (TB5, TB6) to be transmitted are encoded to encoders (502a, 502b) and subsequently transmitted to a block 503 which is similar to the transmission matrix of REMA function block 221 of FIG. 2. The output would subsequently be transmitted to a legacy modulation mapper 504. The detail with regard to the MUST category 3 transmitter is included in 3GPP TR 36.859 which is incorporated by reference for all purposes.

In current LTE standard, user data would be individually turbo-encoded and then multiplexed before high-order modulation is performed. FIG. 6 illustrates a conventional MUST transmitter according to the current LTE standard. The MUST transmitter of FIG. 6 would take information bits of a UE and encode the information bits of the single UE by one turbo encoder 602 with an encoding rate R. The turbo encoder 602 would generate a binary string of L binary levels which are sent to a PAM modulator 603 in parallel. The input of the PAM modulator 603 would thus be a transmission symbol with a plurality of binary levels (e.g.) $X_{level0}$, $X_{level1}$, $X_{level2}$, $X_{levelL-2}$, and $X_{levelL-1}$) as shown in FIG. 6.

FIG. 7 illustrates a conventional non orthogonal MUST transmitter by combining information of two UEs. In non-orthogonal transmission technology, the informational signals that are transmitted from the BS respectively to the two UEs are independently generated. In FIG. 7, the information bits of near UE, $b_N$, is sent to a turbo encoder 702a with a code rate $R_N$, and the information bits of far UE, $b_F$, is sent to a turbo encoder 702b with a code rate $R_F$. The output of the turbo encoders 702a 702b would be combined by symbol-level/codeword-level MUST scheme.

It is worth noting that typically a single user information would be encoded by a single encoder with a specific code rate. Also, currently all the levels in a transmission symbol have the same code rate. However, allocating the same transmission rate to all the levels in a transmission symbol would make not be optimal for the overall performance of a system.

SUMMARY OF THE DISCLOSURE

Accordingly, the disclosure is directed to a method of multiuser superposition transmission (MUST) method and a transmitter using the same method.

In one of the exemplary embodiments, the disclosure is directed to a method of multiuser superposition transmission (MUST) method used by a base station. The method would include not limited to: determining a first bit stream to be transmitted; encoding the first bit stream to generate an encoded first bit stream which has a plurality of binary levels per symbol; determining a first encoding rate for each of the binary levels of the encoded first bit stream, wherein at least two of the levels of the encoded first bit stream have a different code rate; and attaching a first plurality of redundancy bits based on the first encoding rate.

In one of the exemplary embodiment, the disclosure is directed to a base station which includes not limited to a transmitter, a receiver, and a processing circuit coupled to the transmitter and the receiver. The processing circuit is configured at least to: determine a first bit stream to be transmitted; encode the first bit stream to generate an encoded first bit stream which has a plurality of binary levels per symbol; determine a first encoding rate for each of the binary levels of the encoded first bit stream, wherein at least two of the levels of the encoded first bit stream have a different code rate; and attach a first plurality of redundancy bits based on the first encoding rate.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
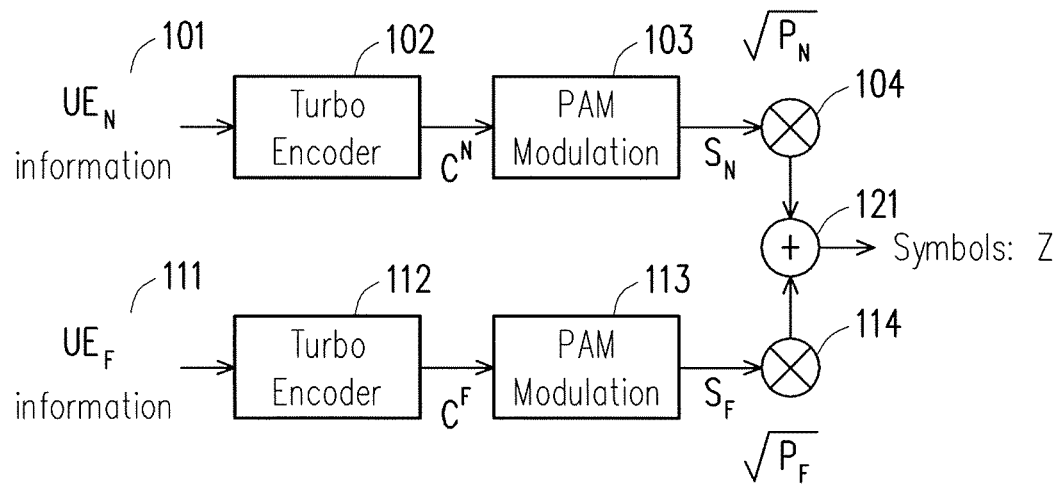
FIG. 1 illustrates a conventional NOMA transmitter.
Figure 1:
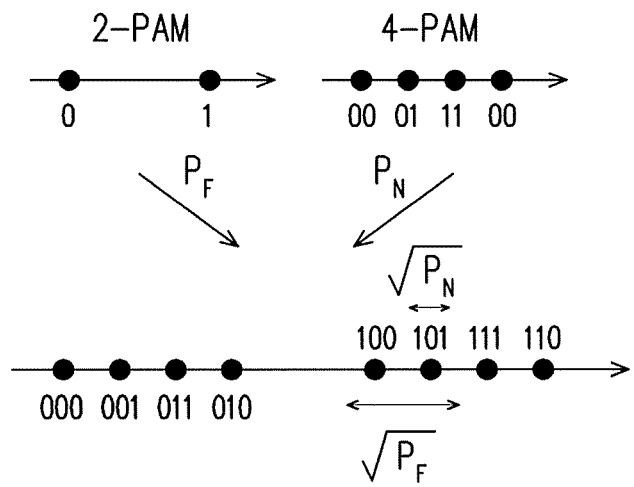

Reference will now be made in detail to the present exemplary embodiments of the disclosure, examples of which are illustrated in the accompanying drawings. Wherever possible, the same reference numbers are used in the drawings and the description to refer to the same or like parts.

As described previously, if all the levels in a transmission symbol have the same code rate in an encoder, then the overall performance of a communication system would not be optimal. Therefore, this disclosure proposes a method of multiuser superposition transmission (MUST) method for a downlink transmitter which could be used by a base station. The proposed method would include determining the code rate for each binary level of a transmission symbol of an encoder and subsequently attaching redundancy bits in multiuser superposition transmission schemes to improve the throughput of a transmitter that utilizes the non-orthogonal transmission technology.

More specifically, in this disclosure, a S-RBA MUST transmitter and a C-RBS MUST transmitter are proposed to enhance the throughput of a current communication system. Not only the S-RBA MUST transmitter but also the C-RBS MUST transmitter would select the rate which corresponds to each level of a transmission symbol for an encoder according to a rate decision rule. Subsequently, both a near UE and a far UE may have their own transmission matrices to determine the number of redundancy bits that could be attached to each level for a S-RBA MUST transmitter. On the other hand, for a C-RBA-transmitter, the near UE and the far UE would have one transmission matrix to determine the number of redundancy bits which could be attached to each level for a C-RBA MUST transmitter. The redundancy bits to be attached for each level by a transmission matrix to adjust the transmission rate would equal to the rate which is determined by a rate decision rule. Further, co-scheduled UEs must know information related to the redundancy bits attachments, and such information could be transmitted in through various means such as through RRC signaling or through a physical downlink control channel (PDCCH).

Figure 8A:
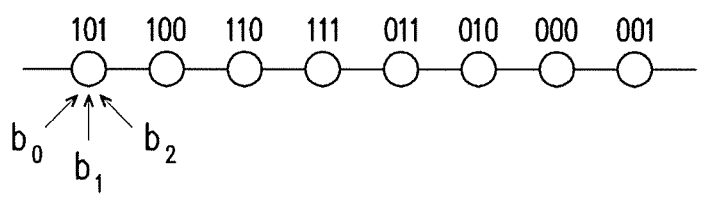
FIG. 8A illustrates a 8-PAM constellation to elucidate the concept of rate decision in accordance with one of the exemplary embodiment of the disclosure.

The concept of choosing transmitting rate could first be described. In general, according to the water filling theorem, the lower transmission rate should be assigned to the worst protection level so that the sum rate would be maximum. Referring to FIG. 8A which illustrates an 8-PAM constellation to elucidate the concept of rate decision, b2 should be assigned the lowest transmission rate. There are several techniques for choosing the transmission rate corresponding to each level. The Capacity Rule is one of the rate decision methods used to find the transmission rate for each level. According to the capacity rule, a transmission rate at an individual level should be chosen equal to the average or maximum capacity of the equivalent channel. Specifically, for 8-PAM modulation as an example, the transmission rate could be expressed as $R_L=C_L$ where $R_L$ and $C_L$ are respectively the transmission rate and capacity of the L-th subchannel.

Figure 8B:
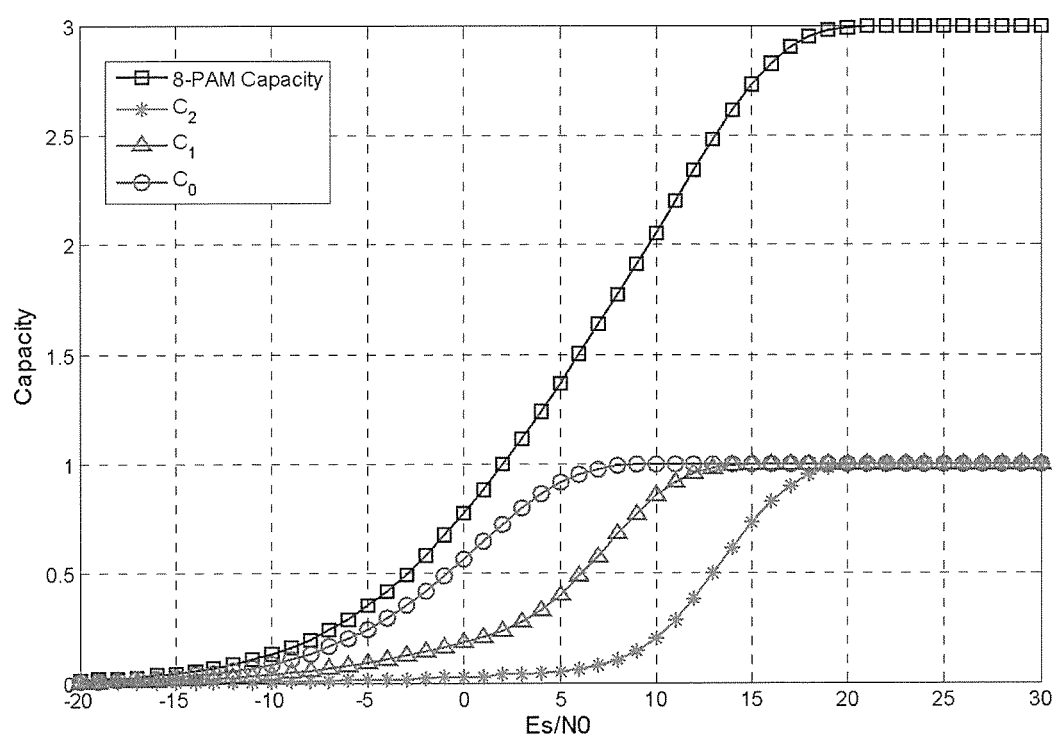
FIG. 8B is a plot which shows the Capacity of each level under 8-PAM modulation in accordance with one of the exemplary embodiment of the disclosure.

For example, suppose that a system has adopted an 8-PAM modulation scheme with natural mapping. Then subject to overall capacity being 2.5, the capacities for bits $x_{level_0}$, $x_{level_1}$, and $x_{level_2}$ could be $C_0=1$, $C_1=0.95$ and $C_2=0.52$, respectively, according to FIG. 8B. Thus, the transmission rate for bits $x_{level_0}$, $x_{level_1}$, and $x_{level_2}$ could be $R_0=1$, $R_1=0.95$ and $R_2=0.52$. If the transmitted bits of two UEs are combined to an 8-PAM symbol with SNR pair $(SNR_{UE\#1}, SNR_{UE\#2})=(10,20)$ and bits mapper $(x_{level_0}, x_{level_1}, x_{level_2})=(UE_{\#1}, UE_{\#2}, UE_{\#2})$, then $C_0$ would be at SNR=10 dB and $C_1$, $C_2$ would be at SNR=20 dB according to FIG. 8B. In addition to capacity rule, other rate decision rules corresponding to different practical design considerations could also be implemented such as random coding exponent rule and cutoff rate rule. After the transmission rate for each binary bit has been determined, redundancy bits would be attached to change the transmission rate of each of the levels. However, the probability of transmitted redundancy bit "1" must be equal to the transmitted redundancy bit "0" to keep the average transmitted power normalized. For example, a pattern of alternating "0"s and "1"s could be utilized to keep the transmitted power normalized.

Figure 9:
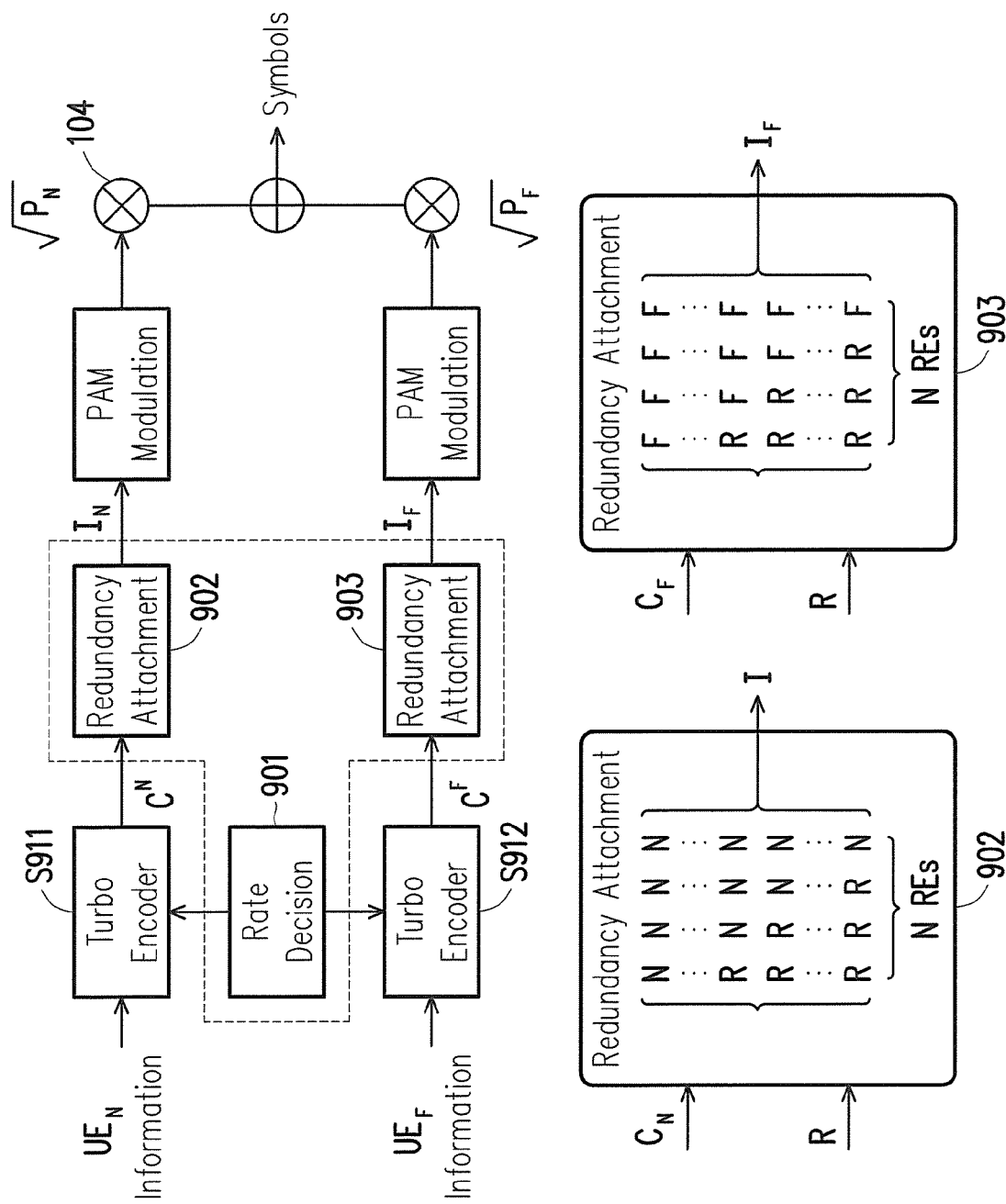
FIG. 9 illustrates a S-BRA-MUST transmitter in accordance with one of the exemplary embodiment of the disclosure.

FIG. 9 illustrates a Symbol-Level Redundancy Bits-Attached MUST (S-BRA-MUST) transmitter in accordance with one of the exemplary embodiment of the disclosure. Each of UE information bits is encoded independently with a different code rate which is decided by a rate decision rule such as a capacity rule, a cutoff rate rule, a coding exponent rule and so forth. Different sets of redundancy bits would then be attached respectively in coded bits of a near UE and a far UE pair. The transmitted bits of each UE would then be mapped to a modulator and then the modulated symbols would be combined with different powers. The notation $P_N$ and $P_F$ in FIG. 9 stand for transmission powers allocated for near UE and far UE signals, respectively.

In addition to the design of FIG. 1, the S-BRA-MUST transmitter would further include, in step S911, determine a first bit stream to be transmitted. The first bit stream would be the near UE ($UE_N$) information which is user data to be received by the near UE. The first bit stream would be encoded by the Turbo Encoder to generate an encoded first bit stream ($C_N$) which outputs as has a plurality of binary levels per symbol, or in other words, is encoded as a binary string in parallel. The Rate Decision module 901 would determine a first encoding rate for each of the levels of the encoded first bit stream ($C_N$). This would mean that each of the levels may have a different code rate. The Redundancy Attachment module 902 may then attach a first plurality of redundancy bits based on the first encoding rate to generate a first output ($I_N$). The first output ($I_N$) would then by modulated by a PAM modulation block and subsequently power scaled according to $\sqrt{P_N}$ to generate a first modulated bit stream.

In step S912, the Turbo Encoder would receive a second bit stream to be transmitted and encode the second bit stream to generate an encoded second bit stream ($C_F$). The Rate Decision module 901 would determine a second encoding rate for the encoded second bit stream. The Redundancy Attachment module 903 would attach a second plurality of redundancy bits based on the second encoding rate determined by the Rate Decision module 901 to generate a second output ($I_F$). The second output ($I_F$) would be modulated by a PAM modulator and power scaled according to $\sqrt{P_F}$ to generate a second modulated bit stream. The power scaled and modulated second output ($I_F$) would be combined with the power scaled and modulated first output ($I_N$) to form a transmission symbol.

In the transmission matrices for the redundancy attachment modules 902 903, the encoded first bit stream ($C_N$) which belongs to the near UE is tagged by "N", and the encoded second bit stream ($C_F$) which belongs to the far UE is tagged by "F." In this exemplary embodiment, the Rate Decision module 901 not only determine the code rate to corresponding to each channel encoders but also determine the number of redundancy bits at each level. The number of redundancy bits could be calculated via (1) for each level.

$$N_{R,level-i} = \left\lfloor N \times \left(1 - \frac{R_i}{R_N}\right)\right\rfloor \quad i=1, 2, \ldots, N_{bit\ level,N} - 1 \quad (1)$$

where N is the total REs which is allocated to paired UE, $R_i$ denotes the transmission rate of the level-i, and $N_{bit\ level,N}$ is the number of transmitted bit allocated to near UE in a symbol-level MUST symbol. The number of redundancy bits should be attached for far UE would be calculated in a similar way.

The formation of the Redundancy Attachment module 902 903 would further include attaching a first plurality of redundancy bits in a redundancy attachment matrix. The first plurality of redundancy bits would not be in the first row since the first row of redundancy attachment matrix would never have any redundancy bits. The second row of redundancy attachment matrix may have a first quantity of redundancy bits. The third row of redundancy attachment matrix may have a second quantity of redundancy bits. No row of the redundancy attachment matrix has all redundancy bits.

Figure 10:
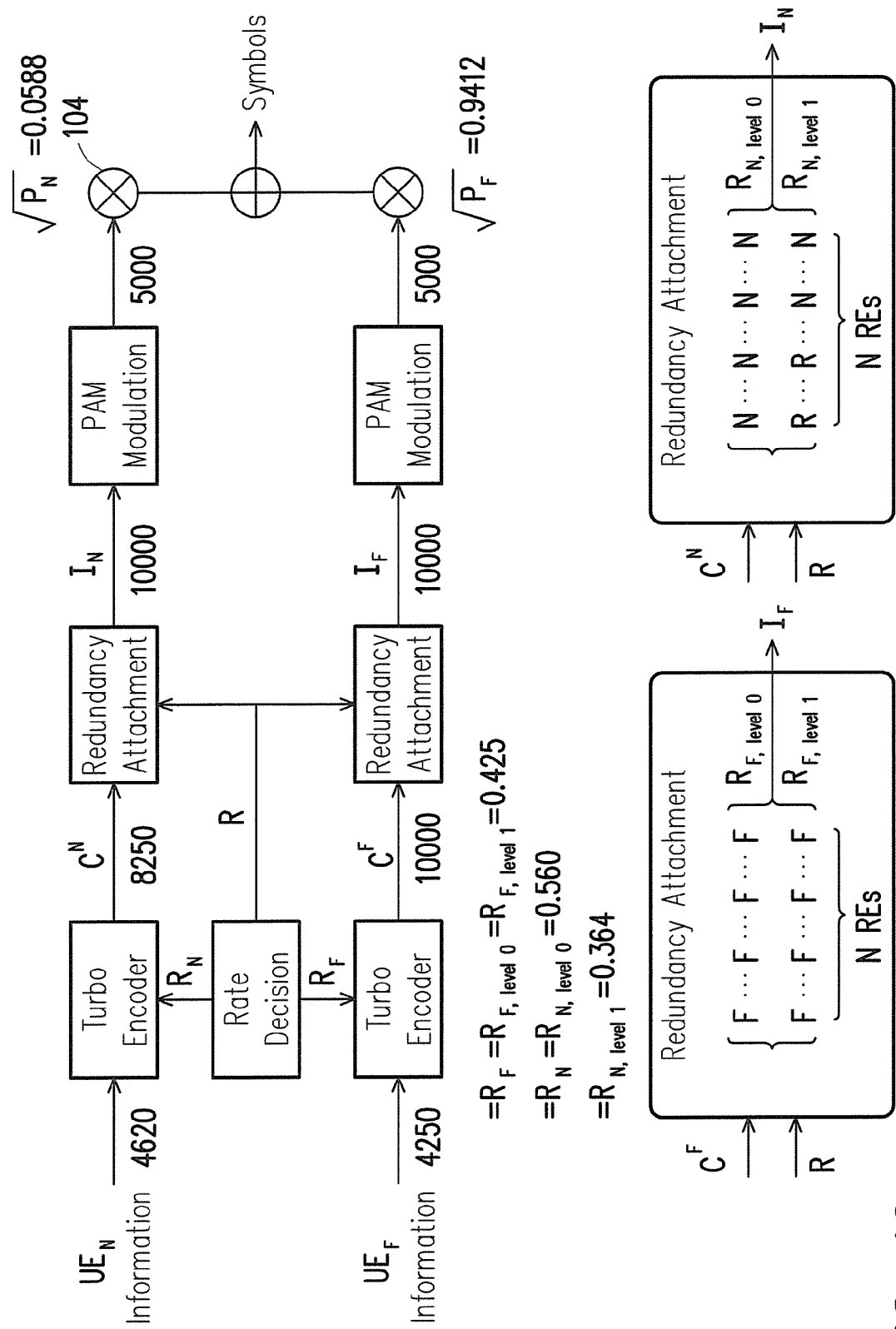
FIG. 10 illustrates an example of a 4-PAM+4-PAM S-RBA MUST transmitter in accordance with one of the exemplary embodiment of the disclosure.

FIG. 10 illustrates an example of a 4-PAM+4-PAM S-RBA MUST transmitter in accordance with one of the exemplary embodiment of the disclosure. The sum rate is 1.774. In the same power allocation, the sum rate of symbol-level MUST with current LTE Tx is 1.6. It would be clear that the best rate decision and power allocation are different between S-RBA MUST and symbol-level MUST with current LTE Tx. For the S-RBA MUST transmitter as proposed, both near UE and far UE would adjust code rate of each level by attaching redundancy bits. And the transmission matrix would be determined for the corresponding UE.

Figure 11:
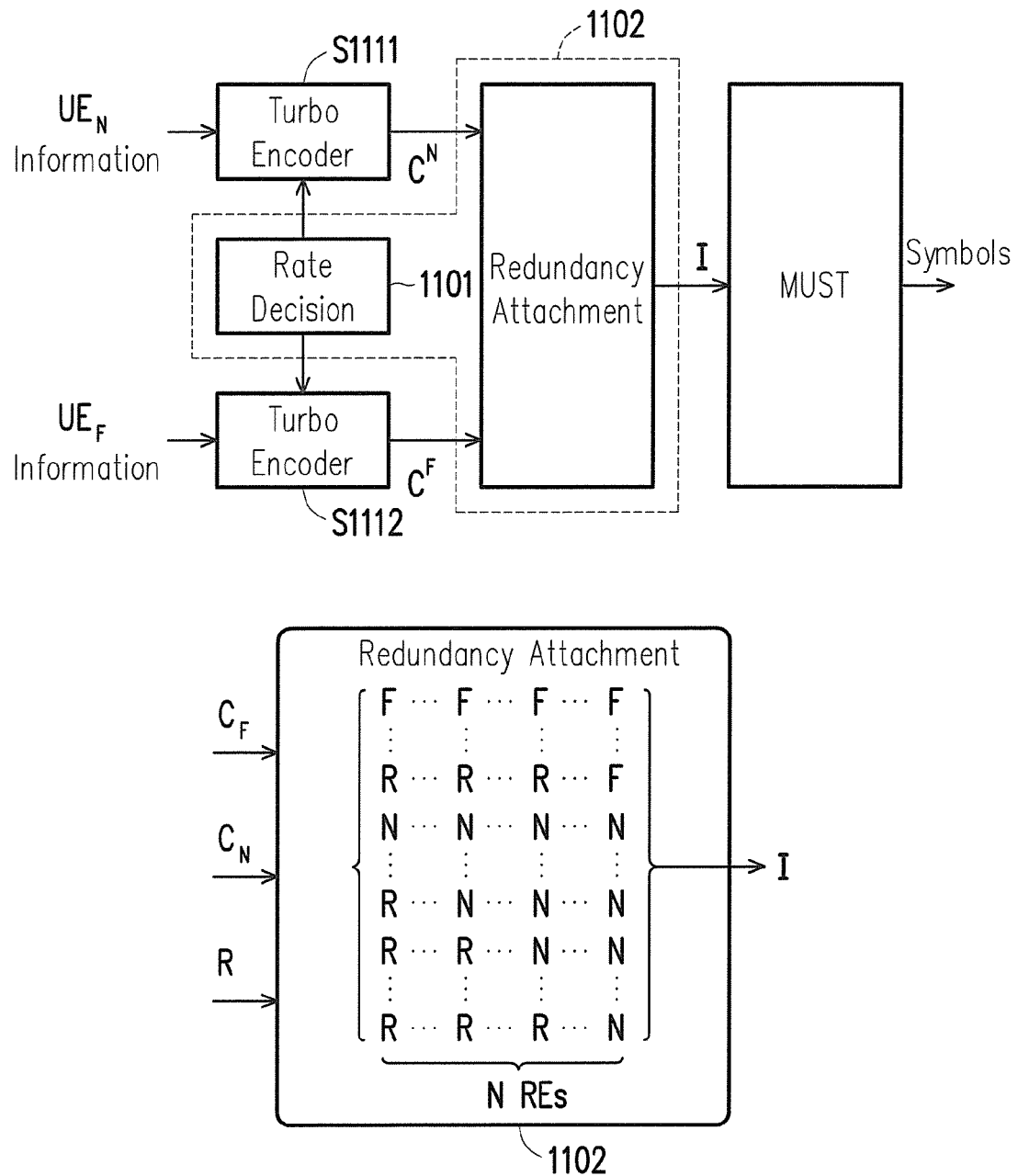
FIG. 11 illustrates a C-RBA-MUST transmitter in accordance with one of the exemplary embodiment of the disclosure.

FIG. 11 illustrates a C-RBA-MUST transmitter in accordance with one of the exemplary embodiment of the disclosure. This exemplary embodiment is an improve version of the design of FIG. 2 by the addition of the Rate Decision module 1101 and the Redundancy attachment module 1102. Similar to the previous exemplary embodiment, each of UE information bits ($UE_N$, $UE_F$) is encoded independently with different code rate which is determined by a rate decision rule such as a capacity rule, a cutoff rate rule, a coding exponent rule and so forth. Then redundancy bits are attached in coded bits of near UE and far UE. Lastly, the transmitted bits of each UE ($UE_N$, $UE_F$) are combined at the bit level and then mapped to PAM modulation. The number of redundancy to each level could be calculated via (2).

$$N_{R,level-i} \left\lceil N \times \left(1 - \frac{R_i}{R_N}\right) \right\rceil \quad i = j, j+1, \ldots, N_L - 1 \qquad (2)$$

where N is the total REs which is allocated to paired UE, R_i denotes the transmission rate of the level-i, j is the number of transmitted bit allocated to Far UE in a MUST symbol, and N_L is total levels in a codeword-level MUST symbol. In a similar way, the number of redundancy bits should be attached for far UE could also be determined.

Figure 2:
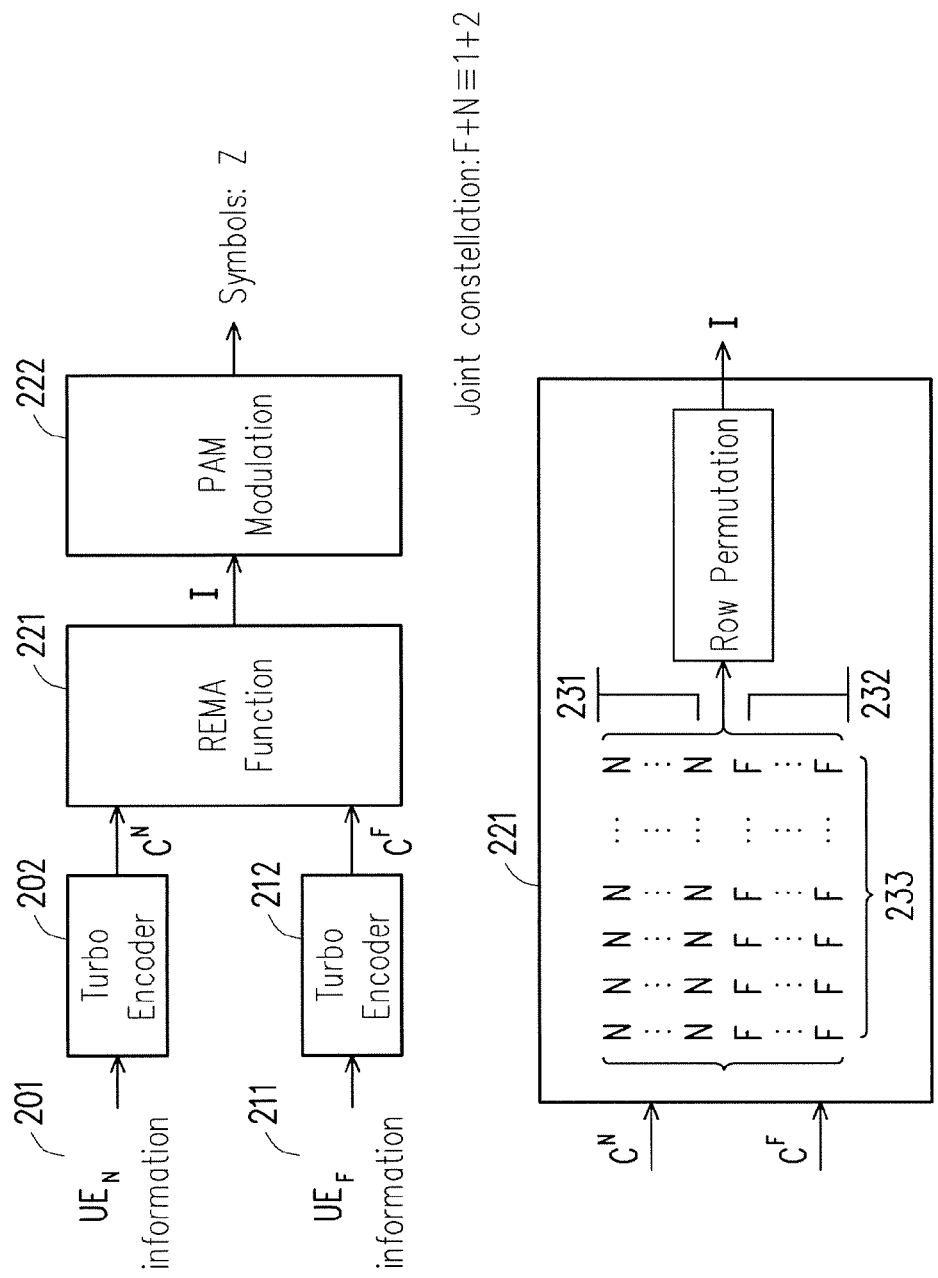
FIG. 2 illustrates a conventional REMA transmitter.
Figure 3A:
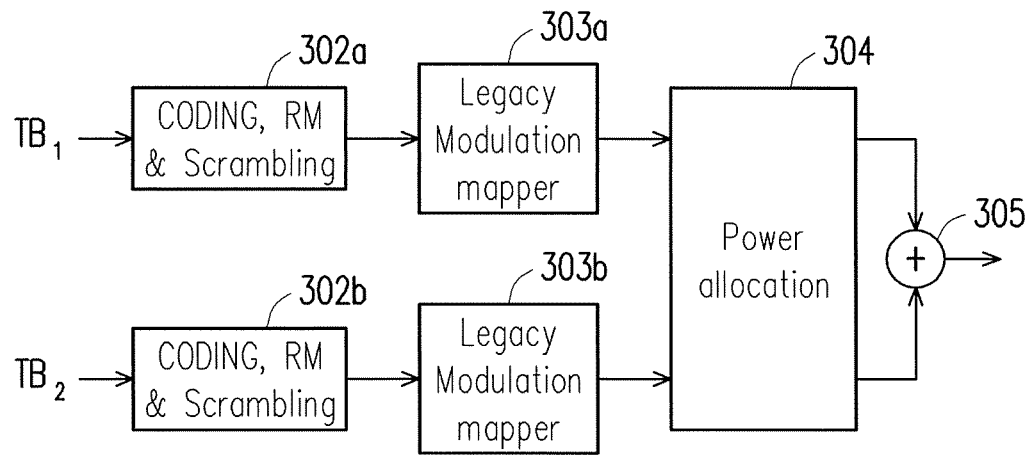
FIG. 3A illustrates a MUST category 1 (NOMA) transmitter according to 3GPP TR 36.859.
Figure 3B:
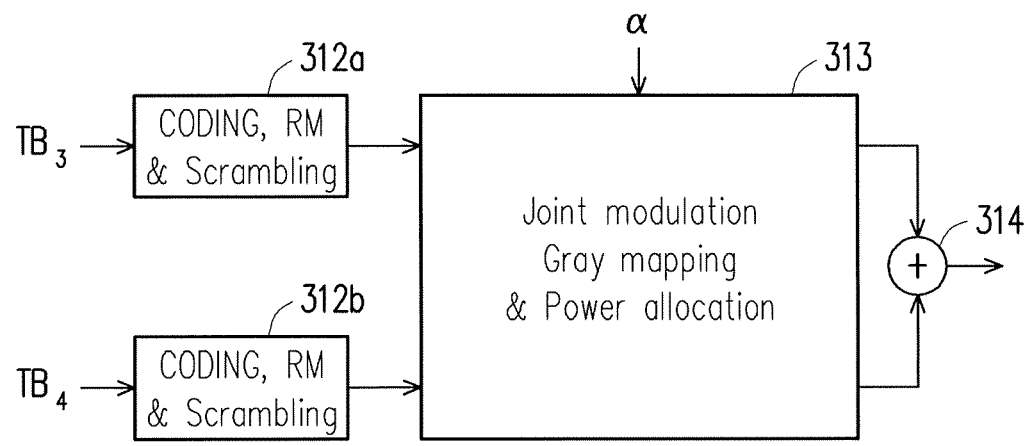
FIG. 3B illustrates a MUST category 2 (NOMA with Gray mapping) transmitter according to 3GPP TR 36.859.
Figure 4:
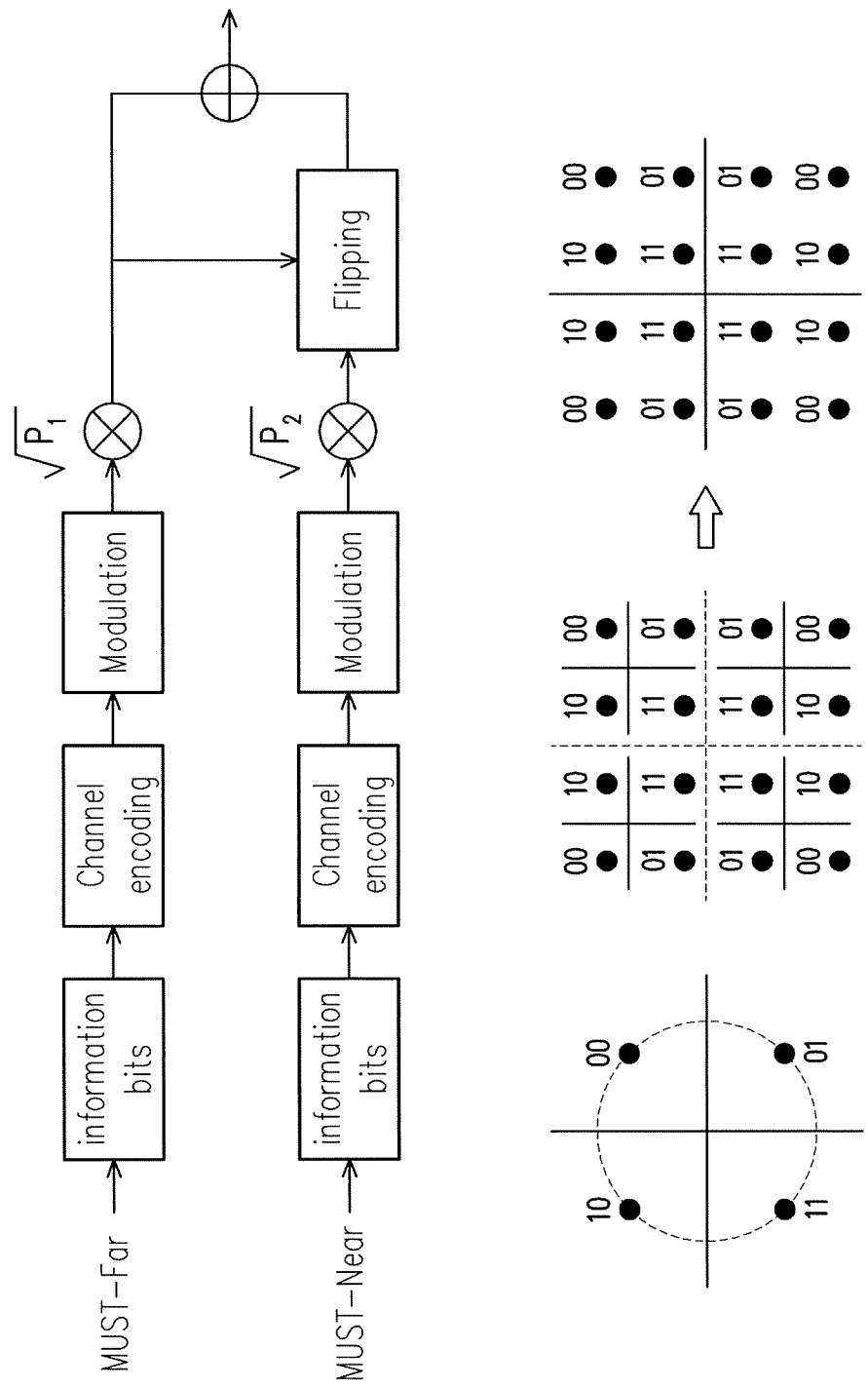
FIG. 4 illustrates downlink MUST for LTE (Rel-14 WI).
Figure 5:
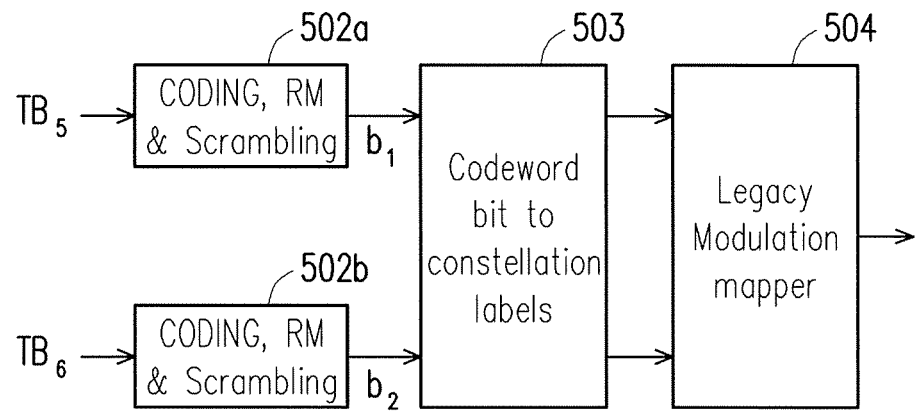
FIG. 5 illustrates a MUST category 3 (REMA) transmitter according to 3GPP
Figure 6:
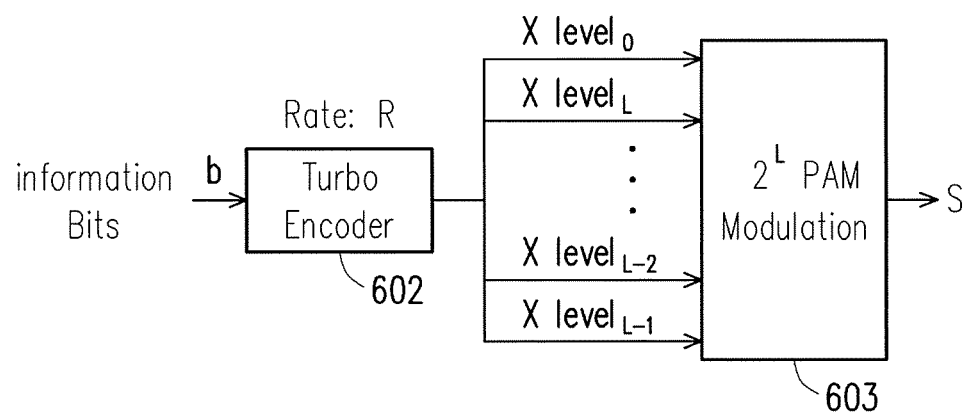
FIG. 6 illustrates a conventional MUST transmitter.
Figure 7:
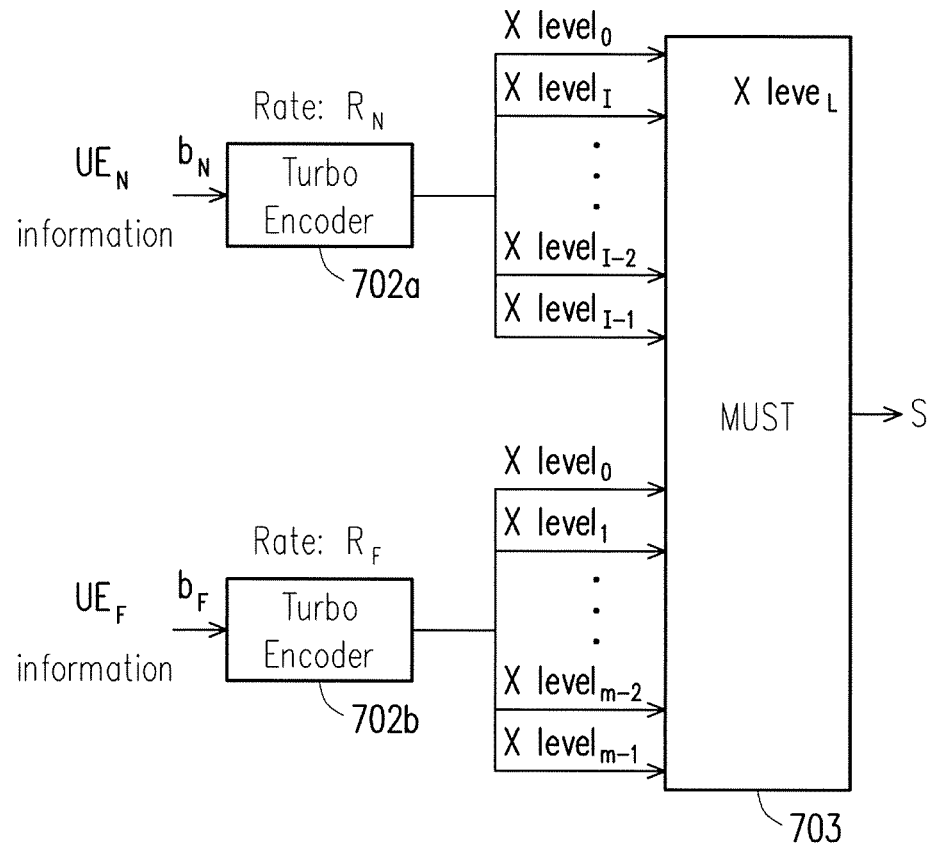
FIG. 7 illustrates a conventional non orthogonal MUST transmitter by combining information of two UEs.

Referring to FIG. 11, In addition to the design of FIG. 2, the exemplary C-RBA-MUST transmitter would further include, in step S1111, determine a first bit stream to be transmitted. The first bit stream would be the near UE ($UE_N$) information which is user data to be received by the near UE. The first bit stream would be encoded by the Turbo Encoder to generate an encoded first bit stream ($C_N$) which outputs as has a plurality of binary levels per symbol, or in other words, is encoded as a binary string in parallel. The Rate Decision module 1101 would determine a first encoding rate for each of the levels of the encoded first bit stream ($C_N$). This would mean that each of the levels may have a different code rate. In step S1112, the Turbo Encoder would receive a second bit stream to be transmitted and encode the second bit stream to generate an encoded second bit stream ($C_F$). The Rate Decision module 1101 would determine a second encoding rate for the encoded second bit stream.

The Redundancy Attachment module 1102 may then receive the encoded first bit stream ($C_N$) and the encoded second bit stream ($C_F$) and attach a first plurality of redundancy bits (R) based on the first encoding rate and the second encoding rate to generate a first output (I). The first output (I) would then by modulated by a PAM modulation block to generate a modulated bit stream.

In the transmission matrix of the Redundancy Attachment modules 1102 as shown in FIG. 11, there is a combination of the encoded first bit stream ($C_N$) which belongs to the near UE is tagged as "N", the encoded second bit stream ($C_F$) which belongs to the far UE is tagged as "F.", and redundancy bits tagged as "R". The transmission matrix would combine the first encoded bit stream which has the first plurality of redundancy bits with the second encoded bit stream which has the second plurality of redundancy bits in a transmission matrix to generate an output matrix (I) which would then be modulated to generate a transmission symbol. Also for the transmission matrix of the Redundancy Attachment modules 1102, for example, the first row could be information bits for $UE_F$ without redundancy bits. In the second row, there could be a first plurality of redundancy bits attached to $UE_F$ information bits. In the third row, there could be a second plurality of redundancy bits attached to $UE_F$ information bits. One of the rows would contain all information bits for the $UE_N$ without any redundancy bits. After that particular row, there could be information bits for the $UE_N$ mixed with a different quantity of redundancy bits for each row, but no row of the transmission matrix would contain all redundancy bits.

Figure 12:
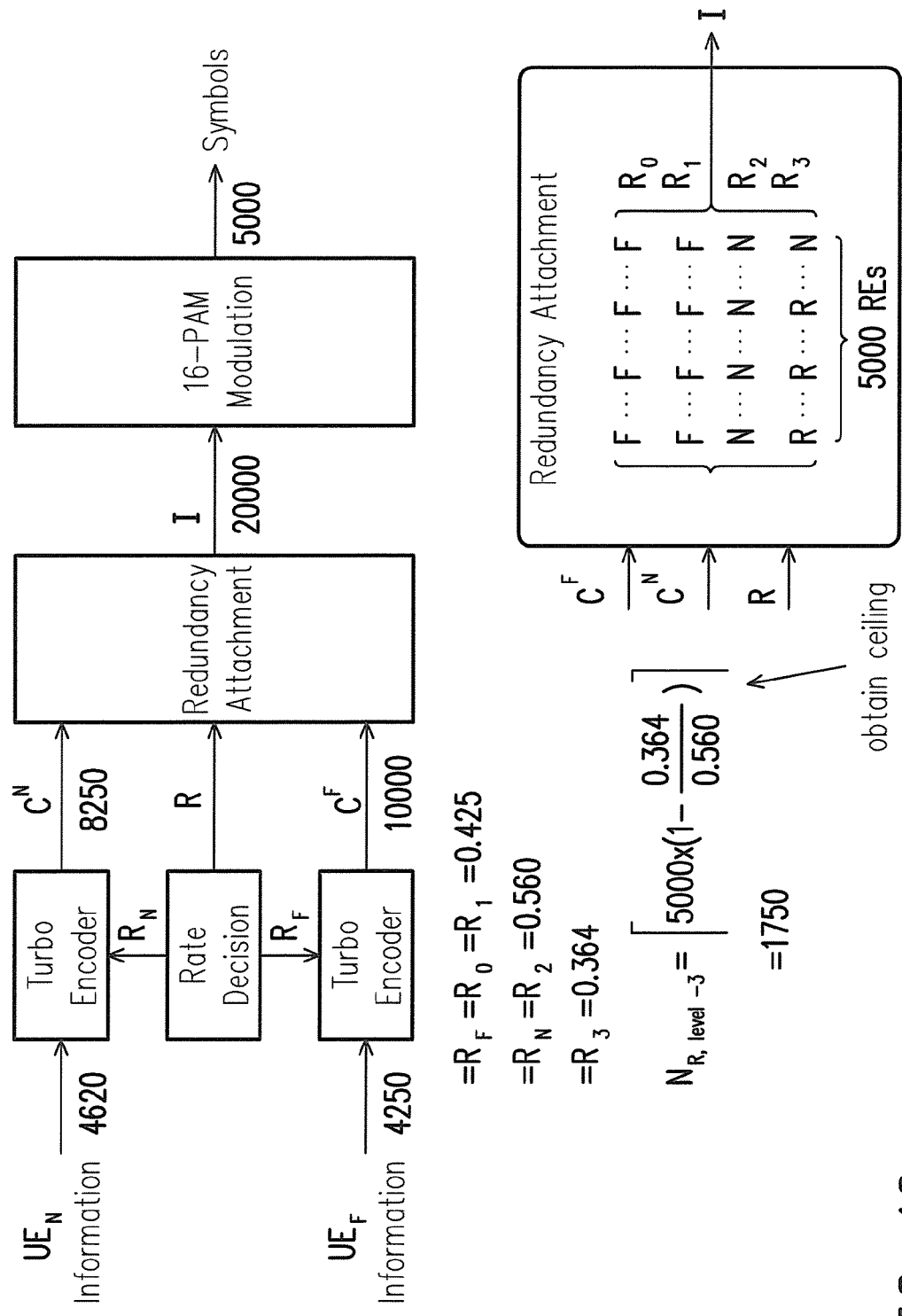
FIG. 12 illustrates an example of a 2+2 C-RBA MUST transmitter in accordance with one of the exemplary embodiment of the disclosure.

FIG. 12 illustrates an example of a 2+2 C-RBA MUST transmitter in accordance with one of the exemplary embodiment of the disclosure. For clarity, the situation of $M=2^{a+b}$-PAM modulation, where a bits from far UE and b bits from near UE, would be denoted by "F+N≡a+b." In this F+N≡2+2 case, the sum rate of C-RBA MUST is 1.774 by CWIC receiver. In the same case, the sum rate of codeword-level MUST with conventional LTE Tx is 1.6 by CWIC receiver. According the example of F+N≡2+2, the best rate decision rate decision is difference between C-RBA MUST and codeword-level MUST with conventional LTE Tx. Identically, the best rate decision is also different between C-RBA MUST and codeword-level MUST with conventional LTE Tx in other cases. For the C-RBA MUST transmitter as proposed, both near UE and far UE could also adjust code rate for each level by attaching redundancy bits. A transmission matrix would be determined to accommodate both the far UE and the near UE.

Figure 13:
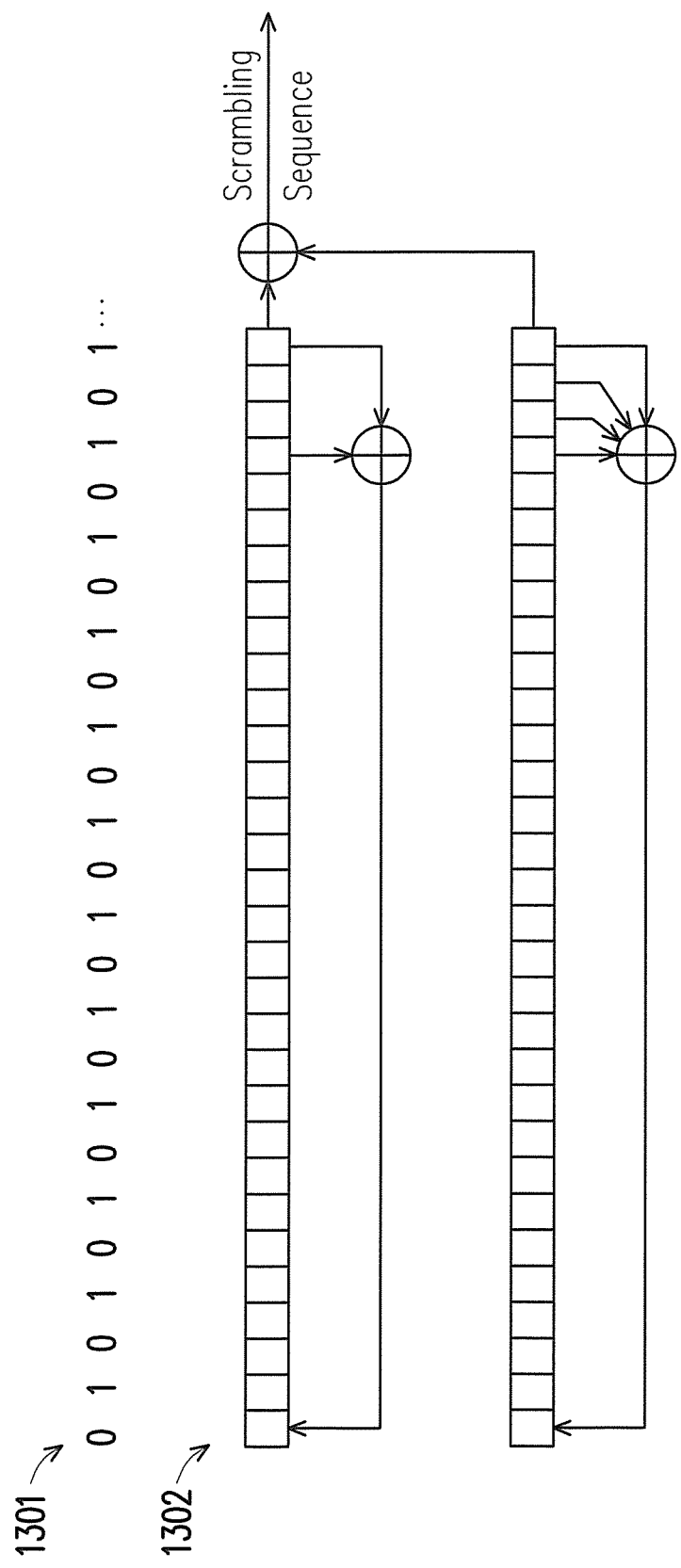
FIG. 13 illustrates redundancy bits generation in accordance with one of the exemplary embodiment of the disclosure.

FIG. 13 illustrates redundancy bits generation in accordance with one of the exemplary embodiment of the disclosure. As described previously, the number of "0"s and "1"s may need to be the same in order to keep the average transmitted power normalized. One method to generate redundancy bits is by a fixed sequence 1301, such as the pattern of alternating "0"s and "1"s. Further, the "0"s and "1"s sequence could also be generated by a scrambling sequence generator 1302 which generates a pseudo-random sequence. The pseudo-random sequence could be generated according to the cell identifier (ID) of the serving base station. However, the cell ID would need to be known by the receiver. Similarly, the pseudo-random sequence could also be generated by the UE ID. In such case, the UE ID for the other co-scheduled UE would need to be known by the receiver. Such information could be detected by the UE or received externally from the base station. Furthermore, the base station would need to inform co-scheduled UEs whether the transmitted signals would include redundancy bits.

Figure 14A:
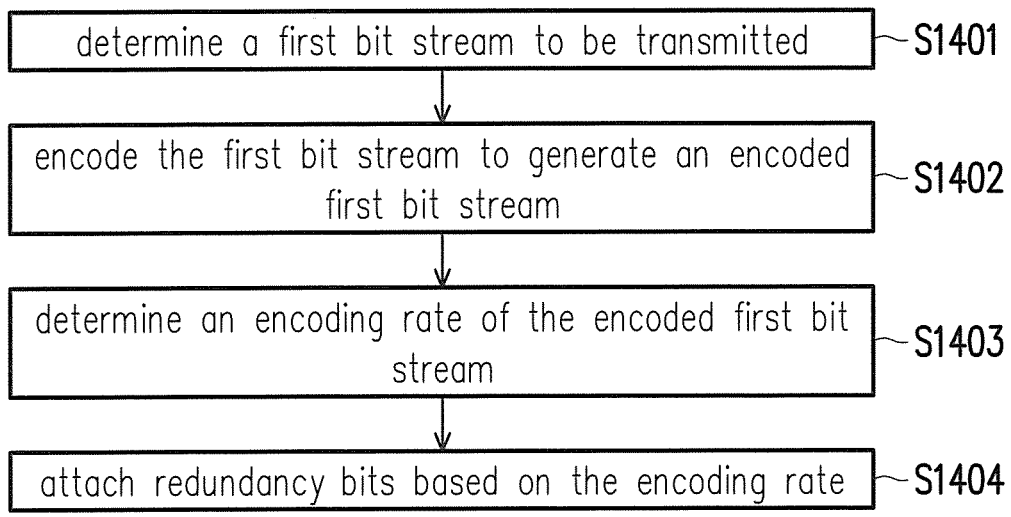
FIG. 14A illustrates a flow chart of the proposed method of multiuser superposition transmission (MUST) method used by a base station in accordance with one of the exemplary embodiment of the disclosure.

FIG. 14A illustrates a flow chart of the proposed method of multiuser superposition transmission (MUST) method which could be used by a transmitter of a base station in accordance with one of the exemplary embodiment of the disclosure. In step S1401, the transmitter would have a bit stream to be transmitted. The bit stream would be the bit stream to be transmitted to a near UE or far UE. In step S1402, the transmitter would encode the bit stream to generate an encoded first bit stream which has a plurality of binary levels per symbol. In step S1403, the transmitter would determine an encoding rate for each of the levels of the encoded first bit stream. This means that each level may have a different code rate. In step S1404, the transmitter would attach a plurality of redundancy bits based on the encode rate.

Figure 14B:
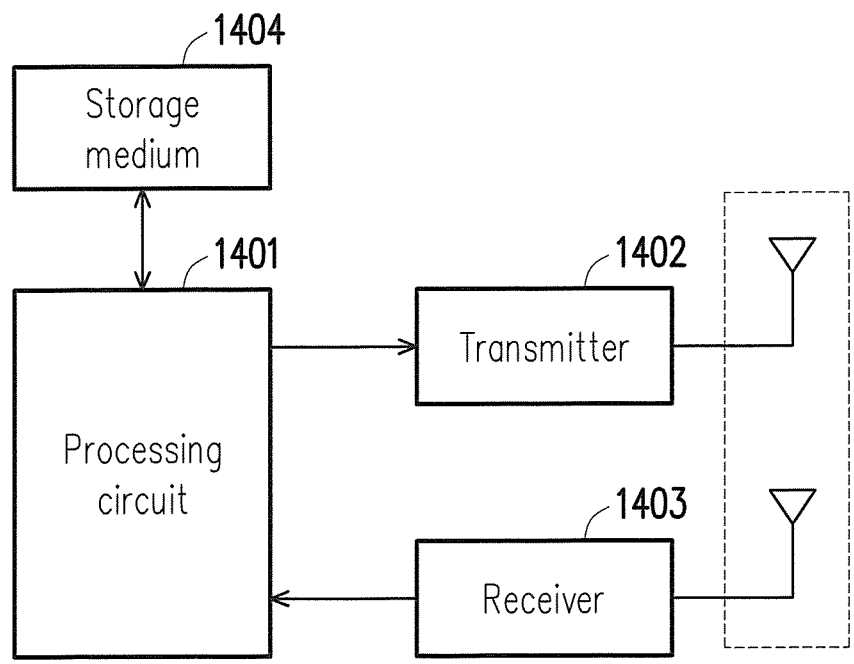
FIG. 14B illustrates the hardware of an exemplary base station in terms of functional blocks in accordance with one of the exemplary embodiment of the disclosure.

FIG. 14B illustrates the hardware of an exemplary base station in terms of functional blocks in accordance with one of the exemplary embodiment of the disclosure. The exemplary base station may include not limited to a processing circuit 1401 electrically connected to a transmitter 1402, a receiver 1403, and a storage medium 1404. The transmitter 1402 and the receiver 1403 would be configured to transmit and receive radio frequency (RF) signals wirelessly. The processing circuit 1401 would be configured to implement the proposed method of multiuser superposition transmission (MUST) as described in FIG. 8~FIG. 14A. The functions of the processing circuit 1401 could be implemented by using one or more programmable units such as a microprocessor, a micro-controller, a DSP chips, FPGA, etc. The functions of the processing circuit 1401 may also be implemented with separate electronic devices or ICs and may be implemented within the domain of either hardware or software. The storage medium 1404 could be a flash drive, a hard disk drive, or any storage drives that may provide temporary or permanent storages.

In view of the aforementioned descriptions, the present disclosure is suitable for being used in a wireless communication system and is able to enhance the throughput transmitter that utilizes the MUST technology by determining the code rate for each level of the encoder of the transmitter and subsequently attaching redundancy bits according to the code rate.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of multiuser superposition transmission (MUST) applicable to a base station, the method comprising:
   determining a first bit stream to be transmitted;
   determining a second bit stream to be transmitted;
   encoding the first bit stream to generate an encoded first bit stream which has a plurality of binary levels per symbol;
   encoding the second bit stream to generate an encoded second bit stream;
   determining a first encoding rate for each of the binary levels of the encoded first bit stream, wherein at least two of the levels of the encoded first bit stream have a different code rate;
   determining a second encoding rate for the encoded second bit stream;
   attaching, to the encoded first bit stream, a first plurality of redundancy bits based on the first encoding rate, and modulating the encoded first bit stream to generate a first modulated symbol stream;
   attaching, to the encoded second bit stream, a second plurality of redundancy bits based on the second encoding rate, and modulating the encoded second bit stream generate a second modulated symbol stream; and
   combining the first modulated symbol stream and the second modulated symbol stream to generate a transmission symbol.

2. The method of claim 1 further comprising:
   combining the first modulated symbol stream scaled by a first power level and the second modulated symbol stream scaled by a second power level to generate the transmission symbol.

3. The method of claim 1, wherein attaching the first plurality of redundancy bits based on the first encoding rate comprising:
   attaching the first plurality of redundancy bits in a redundancy attachment matrix, wherein a first row of redundancy attachment matrix does not have any redundancy bit, a second row of redundancy attachment matrix has a first quantity of redundancy bits, a third row of redundancy attachment matrix has a second quantity of redundancy bits, and no row of the redundancy attachment matrix has all redundancy bits.

4. The method of claim 1 further comprising:
   combining the encoded first bit stream which has the first plurality of redundancy bits with the encoded second bit stream which has the second plurality of redundancy bits in a transmission matrix to generate an output matrix; and
   modulating the output matrix to generate a transmission symbol.

5. The method of claim 4, wherein the transmission matrix comprises
   a first row of bits for a near user equipment (near UE) attached with the first plurality of redundancy bits; and
   a second row of bits for a far user equipment (far UE) attach with the second plurality of redundancy bits.

6. The method of claim 5, wherein the transmission matrix further comprising:
   a third row of bits for the near UE without any redundancy bits;
   a fourth row of bits for the far UE without any redundancy bits; and
   no row in the transmission matrix has all redundancy bits.

7. The method of claim 1, wherein determining the first encoding rate comprising:
   determining the first coding rate according to a capacity rule, a cutoff rate rule, or a coding exponent rule.

8. The method of claim 1, wherein the first plurality of redundancy bits is generated according to a fixed sequence or a pseudo random sequence generated by a cell identifier (ID) or a user equipment (UE) ID.

9. The method of claim 8 further comprising:
   informing, to a user equipment, the first plurality of redundancy bits embedded in a radio resource control (RRC) signaling or a downlink control information (DCI).

10. A base station comprising:
    a transmitter;
    a receiver; and
    a processing circuit coupled to the transmitter and the receiver and is configured at least to:
    determine a first bit stream to be transmitted;
    determine a second bit stream to be transmitted;

encode the first bit stream to generate an encoded first bit stream which has a plurality of binary levels per symbol;

encode the second bit stream to generate an encoded second bit stream;

determine a first encoding rate for each of the binary levels of the encoded first bit stream, wherein at least two of the levels of the encoded first bit stream have a different code rate;

determine a second encoding rate for the encoded second bit stream;

attach, to the encoded first bit stream, a first plurality of redundancy bits based on the first encoding rate, and modulate the encoded first bit stream to generate a first modulated symbol stream;

attach, to the encoded second bit stream, a second plurality of redundancy bits based on the second encoding rate, and modulate the encoded second bit stream to generate a second modulated symbol stream; and combine the first modulated symbol stream and the second modulated symbol stream to generate a transmission symbol.

11. The base station of claim 10, wherein the processing circuit is further configured to:

combine the first modulated symbol stream scaled by a first power level and the second modulated symbol stream scaled by a second power level to generate the transmission symbol.

12. The base station of claim 10, wherein the processing circuit is configured to attach the first plurality of redundancy bits based on the first encoding rate comprising:

attach the first plurality of redundancy bits in a redundancy attachment matrix, wherein a first row of redundancy attachment matrix does not have any redundancy bit, a second row of redundancy attachment matrix has a first quantity of redundancy bits; a third row of redundancy attachment matrix has a second quantity of redundancy bits, and wherein no row of the redundancy attachment matrix has all redundancy bits.

13. The base station of claim 10, wherein the processing circuit is further configured to:

combine the encoded first bit stream which has the first plurality of redundancy bits with the encoded second bit stream which has the second plurality of redundancy bits in a transmission matrix to generate an output matrix; and modulate the output matrix to generate a transmission symbol.

14. The base station of claim 13, wherein the transmission matrix comprises a first row of bits for a near user equipment (near UE) attached with the first plurality of redundancy bits; and a second row of bits for a far user equipment (far UE) attach with the second plurality of redundancy bits.

15. The base station of claim 14, wherein the transmission matrix further comprising:

a third row of bits for the near UE without any redundancy bits;

a fourth row of bits for the far UE without any redundancy bits; and no row in the transmission matrix has all redundancy bits.

16. The base station of claim 10, wherein the processing circuit is configured to determine the first encoding rate comprising:

determine the first coding rate according to a capacity rule, a cutoff rate rule, or a coding exponent rule.

17. The base station of claim 10, wherein the processing circuit is configured to generate the first plurality of redundancy bits according to a fixed sequence or a pseudo random sequence generated by a cell identifier (ID) or by a user equipment (UE) ID.

18. The base station of claim 17, wherein the processing circuit is further configured to:

inform, to a user equipment, the first plurality of redundancy bits embedded in a radio resource control (RRC) signaling or a downlink control information (DCI).

* * * * *